July 20, 1943.  J. E. HALE  2,324,994
PNEUMATIC TIRE AND RIM ASSEMBLY
Filed June 7, 1941
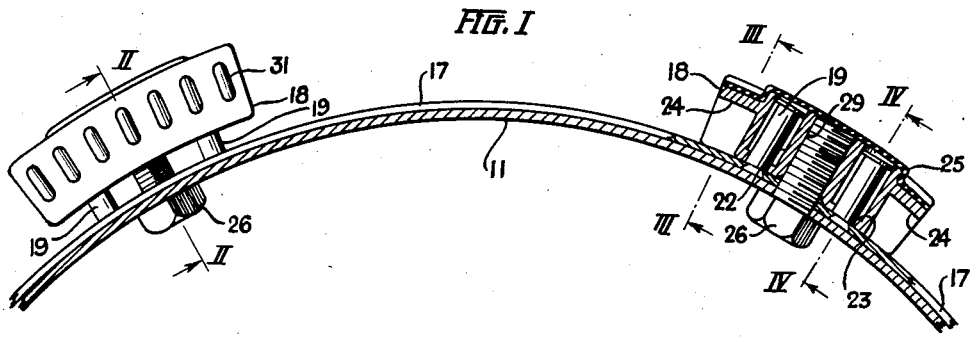
Fig. I
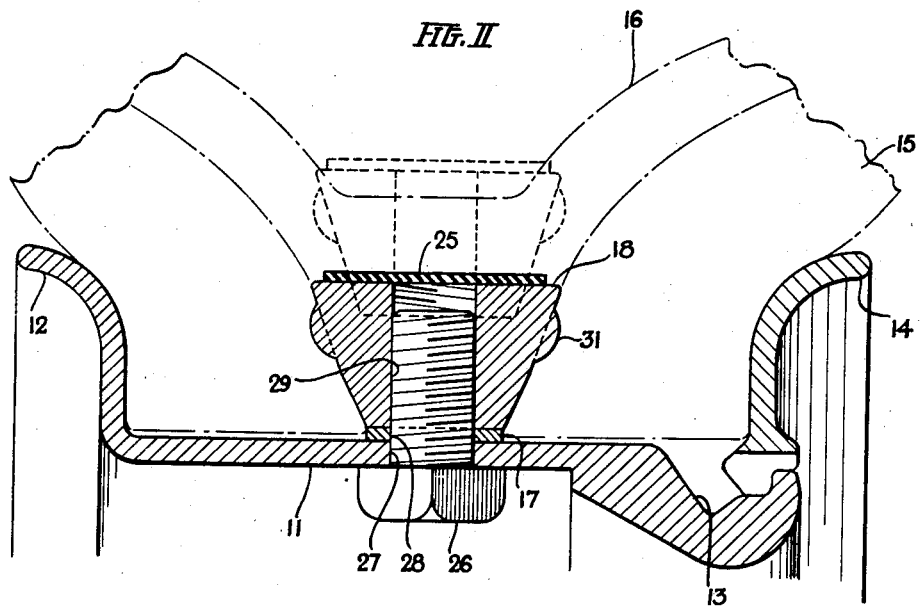
Fig. II
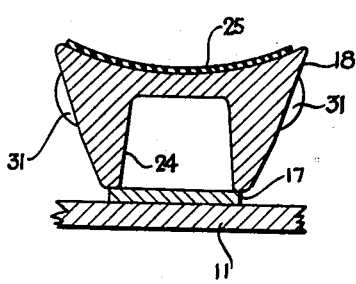
Fig. III
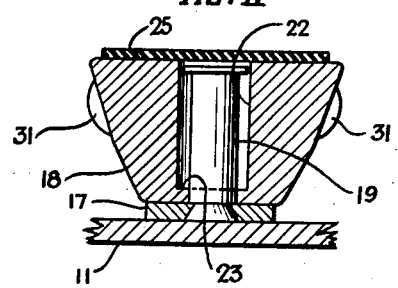
Fig. IV
Inventor
JAMES E. HALE
By Clyr Frye
Attorneys Patented July 20, 1943

2,324,994

UNITED STATES PATENT OFFICE 2,324,994

PNEUMATIC TIRE AND RIM ASSEMBLY

James E. Hale, Akron, Ohio, assignor to The Firestone Tire & Rubber Company, Akron, Ohio, a corporation of Ohio Application June 7, 1941, Serial No. 397,103

4 Claims. (Cl. 152—401)

This invention relates to pneumatic tire and rim assemblies, especially to assemblies adapted to retain a pneumatic tire thereon and in force-transmitting contact therewith, even though operated when deflated.

When pneumatic tires are mounted on a conventionl rim which is substantially cylindrical and has a removable side flange mounted on one edge, it is obvious that the inside diameter of the tire bead must be slightly larger than the bead seat diameter of the rim in order that the tires can be readily and conveniently applied to, and removed from, the rim by the simple action of telescoping the tire beads over the rim.

In driving a vehicle, or in braking it, the forces producing the change of motion of the vehicle must be transmitted through the tire without the tire slipping or creeping on the rim. It is found that with properly inflated tires this is accomplished through the fact that there is sufficient lateral pressure on the vertical faces of the beads that they are forced into tight frictional contact with the vertical faces of the side flanges sufficiently to accomplish this.

It is possible to compute the forces developed by this lateral pressure on the side flange and prove that if the pressure is sufficient there is no need of any auxiliary means of providing the driving or tractive force, or the braking resistance for the vehicle so long as the requisite air pressure exists in the pneumatic tires. However, if, for any reason, the air pressure in the tire becomes so low in relation to the conventional air pressure, or the air pressure in the tire is completely exhausted, then there will be an absence of sufficient pressure forcing the beads against the flange to provide this action. Accordingly, in that event, it is necessary to provide for lateral pressure against the flanges.

Attempts have been made to provide pneumatic tire and rim assemblies which can be operated, even though the pneumatic tire carried thereon is deflated, without rotating the tire on the rim, or pulling the tire off the wheel. These constructions generally involve use of some type of annular pressure member carried on a circumferentially divided wheel, or rim, and adapted to exert pressure upon the beads of a mounted tire and force same out against the rim flanges. However, substantially all of these constructions involve the use of a continuous compressible member received between the tire beads and are costly, while also using a mass of rubber, or similar substance which may be difficult to obtain.

The general object of this invention is to provide mechanical means for insuring that a definite pressure forces the beads of a pneumatic tire against the side flanges of the rim on which it is positioned, even though there is no pneumatic pressure in the tire. Such mechanical means may be termed a "bead lock."

Another object of the present invention is to provide a bead lock type of pneumatic tire assembly that effectively secures the tire beads in fixed relation to a rim and that overcomes the foregoing and other disadvantages of known constructions.

Another object of the invention is to provide a bead lock tire assembly adapted to use standard type flat base rims having either a continuous or a discontinuous removable side flange thereon ordinarily received in a gutter formed at one extremity of a rim base.

Still another object of the invention is to position a pneumatic tire on a cylindrical rim so that the tire beads are held in driving contact with the rim flanges regardless of the volume of air within the tire.

A further object of the invention is to provide a bead lock construction which can be placed in inoperative position during assembly of the wheel and which thereafter can be readily brought into operative position.

The foregoing and other objects will be manifest as the specification proceeds.

In the accompanying drawing:

Figure I is an elevation, partly in section, of a wheel assembly embodying the invention;

Figure II is a transverse section taken on line II—II of Figure I, with a tire mounted thereon; and Figures III and IV are transverse sections of the wedge means, taken on lines III—III and IV—IV of Figure I.

Referring specifically to the accompanying drawing, a standard type flat base rim 11 is provided which has an integral rim flange 12 at one extremity thereof and a side ring receiving gutter 13 formed at the other extremity thereof. A rim side ring 14 of standard construction is received in the rim gutter 13. A standard pneumatic tire 15 is received on the rim 11, which tire may have a tube 16 received therein, said tube being of the self-sealing type.

The bead lock means of the invention include an annular metal band 17 made from springy material, which band is designed and arranged so that it fits snugly on the outer periphery of the rim 11 and can be readily telescoped thereon when the rim side ring 14 is removed. A plurality of circumferentially spaced metallic locking blocks 18 are secured to the band 17 and are adapted to be received between the beads of the tire 15. The blocks are of such size that they force the tire beads outwardly against the rim flanges when they are adjacent the band 17 and so that they are entirely free from the tire beads when moved to their radially outer positions, as hereinafter described. Any suitable number of locking blocks may be used, as long as they are balanced circumferentially of the wheel assembly and are present in sufficient numbers to insure locking the beads of the tire 15 against the rim flanges, as hereinafter described. The metal blocks 18 are wedge-shaped in section, as shown in Figure II, with the radially outer surface of the block being larger than the radially inner surface, which is slightly arcuate in a longitudinal direction and which, in operative position, may abut on the band 17. The blocks 18 are secured to the band 17 by suitable lost motion connectors, in this case, comprising headed pins 19 which are received in apertures 22 extending through the blocks 18. Shoulders 23 are formed in the apertures 22 adjacent the radially inner surface of the blocks, so that a reduced diameter section is formed adjacent the inner surfaces of the blocks. The heads of the pins 19 are adapted to seat upon the shoulders 23 and limit radially outward movement of the blocks with relation to the band 17. Note that the ends of the blocks 18 are cored out at 24 in order to cut down the weight of the blocks, and the outer surfaces of the ends of the blocks may be beveled off or rounded off longitudinally, if desired. A covering material 25 may be placed over the outer surface of the blocks. This covering may be made from fabric, or rubber, or other suitable material, and it serves to protect the portion of the tube 16 contacting the block.

The positions of the blocks 18 with relation to the band 17 are controlled by screws 26 that extend through holes 27 formed in the rim base 11 and through holes 28 formed in the band 17. These screws 26 engage with tapped holes 29 formed in the centers of the inner surfaces of the blocks 18. Usually either the holes 27, or the holes 28 are tapped in order that the screw 26 is in positive engagement either with the rim base 11 or the band 17. Then by engaging the screw with the tapped aperture 29, the blocks 18 can be positively positioned radially with relation to the band 17 and, in turn, with relation to the beads of the tire 15. This should be done before the tire is assembled on the rim. However, it may be desirable to mount the ring 17 and the wedge blocks within a tire before mounting same on a rim. Then neither hole 27 or 28 should be tapped, and the screws 26 would be engaged with the blocks after the tire is mounted on the rim. In all events, the blocks are to be placed in their inoperative, or non-wedging positions when the rim side ring is positioned.

Radially extending lugs 31 may be formed on the tapered side surfaces of the blocks 18 to set up friction between and obtain a better grip on the tire beads, when the blocks are in contact therewith.

In assembling the wheel construction of the invention, the screws 26 are first engaged with the blocks 18 only a short distance so that the blocks 18 can be positioned in radially spaced relationship with the rim base 11. When the wheel is completely assembled, the screws 26 should be tightened to draw the blocks 18 down into engagement with the beads of the tire 15 and force them outwardly tightly against the rim flanges. Preferably, the blocks are drawn in against the tire beads substantially uniformly. In disassembling the wheel, the air within the tube 16 should be valved therefrom, after which the blocks 18 should be moved radially outwardly from the band 17 by loosening the screws 26. Then the rim side ring 14 can be removed from the ring base 11, as in standard practice, and the tire removed from the rim.

In actual tests of the bead lock wheel construction shown herein, highly desirable results have been obtained, and wheel constructions have been operated for many miles with no air pressure in the pneumatic tire, while the blocks have held the tire upon the wheel assembly and enabled operation thereof. The only requirement in adapting standard rim assemblies to applicant's apparatus, is to provide holes in the rim base through which the screws 26 can be engaged with the blocks 18. The present wheel construction is easily manufactured and assembled and the objects of the invention are achieved thereby.

What is claimed is:

1. In a wheel construction for a pneumatic tire, a flat rim base having an integral flange at one edge thereof, a removable side ring forming a second flange for the rim base positioned at the other edge of said rim base, a continuous metal band fitting onto the periphery of said rim base, a plurality of metal blocks fitting on said band, a plurality of headed pins securing said band to said blocks, said pins being received in apertures formed through said blocks, said apertures having shoulders formed therein adjacent the inner surfaces of said blocks with which said headed pins engage but which allow limited radial movement of said blocks with relation to said band before engaging therewith, each of said blocks having a tapped recess extending thereinto from the inner side thereof, each of said blocks being wedge shaped in section and being narrower in the side thereof adjacent said band than in the side thereof removed from said band, and screws securing said band to said rim and engaging with the tapped recesses in said blocks whereby said blocks can be positively moved radially outwardly from said band even after a tire is assembled on said rim, said blocks being of such size as to lock the beads of a pneumatic tire against said rim flanges when drawn down adjacent the periphery of said band but to be free from the beads when moved to their radially outer positions.

2. In a wheel construction including a rim adapted to mount a pneumatic tire, and a removable flange member for the rim, a continuous metal band adapted to fit snugly upon said rim, a plurality of metallic blocks wedge shaped in section and wider at their tops than at their bases, means securing said blocks in circumferentially spaced relation to said metal band with the bases of said blocks being adjacent the outer surface of said metal band, said means enabling lost motion between said blocks and said band in a radial direction, and means securing said band to a rim base and controlling the relative radial positions of said blocks with relation to said metal band, said means comprising bolts extending through the rim for threaded engagement with the blocks, said blocks being of such size as to press the beads of a pneumatic tire on said rim tightly against the flanges of the rim and lock the tire thereon, when drawn into clamped engagement with the rim.

3. In a rim and tire assembly, the combination with a flanged tire receiving rim having a cylindrical center portion and marginal bead engaging flanges, at least one of which is removably secured to the center portion, and a pneumatic tire mounted on the rim with bead portions abutting said marginal flanges, of spreader means applied peripherally of the center rim portion and disposed within the tire intermediate the beads thereof, said means comprising an annular metallic band mounted over the center portion of the rim, and a plurality of circumferentially disposed spreader blocks, frustro-conical in cross section and attached apex inwardly to the band, said blocks being provided with spaced apertures and said band being provided with outwardly extending pins having head portions disposed in said apertures and means preventing withdrawal of the pin head portions from the apertures to enable movement of the blocks in a direction radial of said band while securing against block movement circumferentially thereof, and clamp means extending through the rim and threadedly engaging the blocks whereby the blocks may be drawn toward the rim under pressure to maintain the tire beads locked in pressure engagement between the rim flanges and the blocks.

4. In combination with a pneumatic tire and rim assembly of the class described, a bead locking device comprising an inextensible endless band having a plurality of rigid wedge-shaped tire bead clamping units secured thereto by lost motion connectors, said units being arranged in circumferentially spaced relation about said band and having centrally located threaded apertures adapted to engage in threaded relation with bolts projected radially outwardly through holes formed in the base of said rim, whereby said clamping units may be drawn radially inwardly firmly against said tire beads and removably secured in such bolted position thereby providing means for retaining the tire on its rim independently of tire inflection pressure.

JAMES E. HALE.